United States Patent
Boyd et al.

(10) Patent No.: US 7,376,859 B2
(45) Date of Patent: May 20, 2008

(54) METHOD, SYSTEM, AND ARTICLE OF MANUFACTURE FOR DATA REPLICATION

(75) Inventors: Kenneth Wayne Boyd, Tucson, AZ (US); Robert Frederic Kern, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 10/690,068

(22) Filed: Oct. 20, 2003

(65) Prior Publication Data

US 2005/0097391 A1   May 5, 2005

(51) Int. Cl.
*G06F 11/00* (2006.01)
(52) U.S. Cl. .............................. 714/3; 714/6
(58) Field of Classification Search ............... 714/6, 714/3
See application file for complete search history.

(56) References Cited

U.S. PATENT DOCUMENTS

| | | | | |
|---|---|---|---|---|
| 5,008,882 | A * | 4/1991 | Peterson et al. | 370/406 |
| 5,181,017 | A * | 1/1993 | Frey et al. | 709/239 |
| 5,513,314 | A * | 4/1996 | Kandasamy et al. | 714/6 |
| 5,608,865 | A * | 3/1997 | Midgely et al. | 714/1 |
| 5,621,884 | A * | 4/1997 | Beshears et al. | 714/10 |
| 5,633,999 | A * | 5/1997 | Clowes et al. | 714/6 |
| 5,963,448 | A * | 10/1999 | Flood et al. | 700/82 |
| 6,266,335 | B1 * | 7/2001 | Bhaskaran | 370/399 |
| 6,304,980 | B1 * | 10/2001 | Beardsley et al. | 714/6 |
| 6,418,508 | B1 | 7/2002 | Saito | |
| 6,691,245 | B1 * | 2/2004 | DeKoning | 714/6 |
| 6,694,447 | B1 * | 2/2004 | Leach et al. | 714/6 |
| 6,839,865 | B2 * | 1/2005 | Gould et al. | 714/6 |
| 6,898,727 | B1 * | 5/2005 | Wang et al. | 714/4 |
| 6,973,586 | B2 * | 12/2005 | Petersen et al. | 714/6 |
| 7,003,693 | B2 * | 2/2006 | Allen et al. | 714/15 |
| 7,043,665 | B2 * | 5/2006 | Kern et al. | 714/5 |
| 2002/0042866 | A1 | 4/2002 | Grant et al. | |
| 2002/0097687 | A1 * | 7/2002 | Meiri et al. | 370/254 |
| 2003/0014433 | A1 * | 1/2003 | Teloh et al. | 707/204 |
| 2003/0188233 | A1 * | 10/2003 | Lubbers et al. | 714/100 |
| 2004/0034671 | A1 * | 2/2004 | Kodama | 707/204 |
| 2004/0073830 | A1 * | 4/2004 | Coteus et al. | 714/6 |
| 2004/0098637 | A1 * | 5/2004 | Duncan et al. | 714/6 |
| 2004/0205391 | A1 * | 10/2004 | Thompson | 714/13 |
| 2005/0097391 | A1 * | 5/2005 | Boyd et al. | 714/6 |

FOREIGN PATENT DOCUMENTS

WO    WO 92/18931    10/1992

* cited by examiner

*Primary Examiner*—Scott Baderman
*Assistant Examiner*—Paul F Contino
(74) *Attorney, Agent, or Firm*—Rabindramath Dutta; Konrad Raynes & Victor LLP

(57) ABSTRACT

Provided are a method, system and article of manufacture for switching. An indication is received of a failure of a primary storage subsystem at a switch, wherein the switch couples a host to the primary storage subsystem and a secondary storage subsystem. Subsequently, a command received from the host at the switch is directed to the secondary storage subsystem for completion.

21 Claims, 6 Drawing Sheets

METHOD, SYSTEM, AND ARTICLE OF MANUFACTURE FOR DATA REPLICATION

BACKGROUND OF THE INVENTION

1. Field of the Invention

The present invention relates to a method, system, and an article of manufacture for data replication.

2. Description of the Related Art

Data in information technology systems, including storage systems, may need to be replicated for a variety of reasons, such as, for data migration, data backup, data duplication, etc. Such replication or copying of data may include interactions among hosts, storage systems and connecting networking components of the information technology system.

An enterprise storage server (ESS), such as the IBM* TotalStorage Enterprise Storage Server*, may be a disk storage server that includes one or more processors coupled to storage devices, including high capacity scalable storage devices, Redundant Array of Independent Disks (RAID), etc. The enterprise storage servers are connected to a network and include features for copying data in storage systems. In an information technology system, a host system may send commands to an ESS to read or write data.

*IBM, IBM TotalStorage Enterprise Storage Server, Peer to Peer Remote Copy (PPRC), FlashCopy, OS/390, zOS, HyperSwap are trademarks of International Business Machines Corp.

Data replication may be implemented in many different ways in an information technology system. In certain implementations, data may be replicated locally, i.e., within the same ESS, such as via a fast replication technique, such as, FlashCopy* or Peer to Peer Remote Copy (PPRC*). In other implementations data replication may be performed from a host system to another host system via dual software writes. Dual software writes may include application to application mirroring, file system file system mirroring, data base to data base mirroring and Input/Output (I/O) subsystem to I/O subsystem mirroring, etc.

*IBM, IBM TotalStorage Enterprise Storage Server, Peer to Peer Remote Copy (PPRC), FlashCopy, OS/390, zOS, HyperSwap are trademarks of International Business Machines Corp.

In certain implementations, switching of one storage subsystem to another storage subsystem may be directed by a host system. In such implementations, such as, in the HyperSwap* function offered in the Geographically Dispersed Parallel Sysplex/Peer-to-peer Remote Copy (GDPS/PPRC) solution, the host directed switching may in many cases take between 20-50 seconds to switch a subsystem as numerous host tables may have to be rebuilt pointing to the new device located on the target secondary storage subsystem.

*IBM, IBM TotalStorage Enterprise Storage Server, Peer to Peer Remote Copy (PPRC), FlashCopy, OS/390, zOS, HyperSwap are trademarks of International Business Machines Corp.

SUMMARY OF THE PREFERRED EMBODIMENTS

Provided are a method, system and article of manufacture for switching. An indication is received of a failure of a primary storage subsystem at a switch, wherein the switch couples a host to the primary storage subsystem and a secondary storage subsystem. Subsequently, a command received from the host at the switch is directed to the secondary storage subsystem for completion.

In certain further implementations, on receiving a notification at a monitor application that the primary storage subsystem is functioning properly, data in the secondary storage subsystem is synchronized to the primary storage subsystem, wherein the monitor application is coupled to a hardware unit coupled to the primary storage subsystem.

Provided also are a method, system, and article of manufacture for data replication. An I/O command is received at a switch from a host. If the I/O command is a write I/O, then data is written via the switch to a primary storage subsystem and a secondary storage subsystem, wherein the switch couples the host to the primary storage subsystem and the secondary storage subsystem, and wherein the data written to the primary storage subsystem and the data written to the secondary storage subsystem are the same.

In certain further implementations in the event of a failure of the primary storage subsystem, a switching application in the switch directs a subsequent I/O command from the host to the secondary storage subsystem.

The implementations ensure that data replication is performed via a switch located in the datapath between a host and storage subsystems. The switch may substitute a primary storage subsystem with a secondary storage subsystem in case of failure of the primary storage subsystem. Since the data replication and failure recovery are performed via a switch, recovery from failure can occur substantially instantaneously when compared to systems where data replication and recovery are performed via implementations in the host or the storage subsystems.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several implementations. It is understood that other implementations may be utilized and structural and operational changes may be made without departing from the scope of the present implementations.

Figure 1:
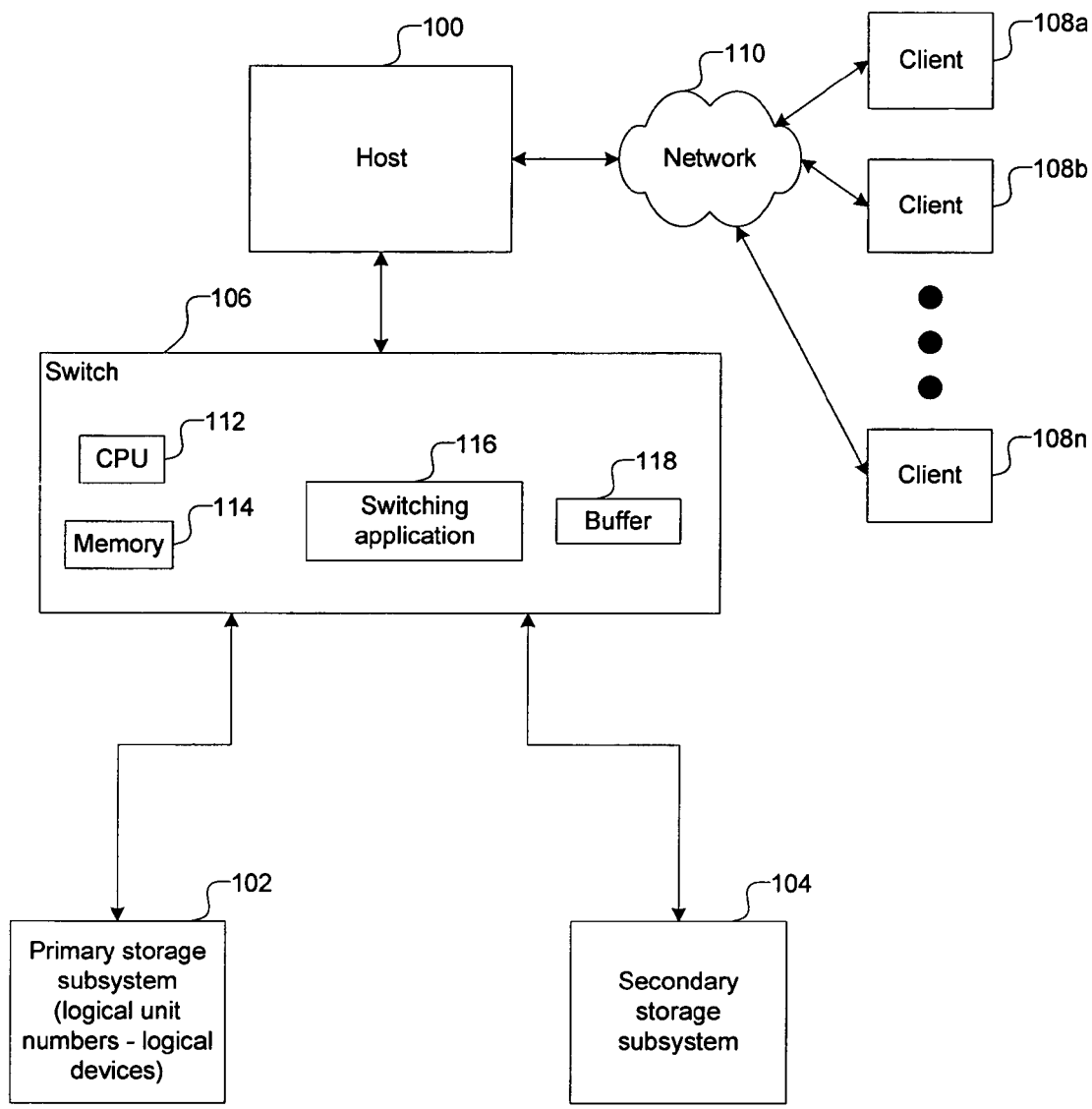
FIG. 1 illustrates a block diagram of a first computing environment, in accordance with certain described aspects of the invention.

FIG. 1 illustrates a block diagram of a computing environment, in accordance with certain described aspects of the invention. A host 100 is connected to a plurality of storage subsystems including a primary storage subsystem 102 and a secondary storage subsystem 104, via a switch 106. Additionally, a plurality of clients 108a, 108b, . . . 108n may connect to the host 100 via a network 110.

The host 100 may be any computational device known in the art, such as, a personal computer, a workstation, a server, a mainframe, a hand held computer, a palm top computer, a telephony device, network appliance, etc. The host 100 may include any operating system (not shown) known in the art, such as the IBM OS/390* or zOS* operating system.

*IBM, IBM TotalStorage Enterprise Storage Server, Peer to Peer Remote Copy (PPRC), FlashCopy, OS/390, zOS, HyperSwap are trademarks of International Business Machines Corp.

The primary storage subsystem 102 and the secondary storage subsystem 104 may include a plurality of logical storage units in which data may be stored. Physically each storage subsystem 102 and 104 may comprise a plurality of physical storage devices where the physical storage devices may correspond to the plurality of logical storage units. The number of storage devices in different subsystems 102, 104 may be same or different. In certain implementations of the invention, the switch 106 ensures that the data in the primary storage subsystem 102 and the secondary storage subsystem 104 are the same. Additionally, in the event of a failure of the primary storage subsystem 102 the switch 106 may transfer commands from the host 100 to be executed with respect to the secondary storage subsystem 104.

The switch 106 may be any switch known in the art, such as, an I/O switch designed and implemented for working in a fibre channel mechanism. The switch 106 may include a central processing unit (CPU) 112, a memory 114, a switching application 116 and a buffer 118. The switching application 116 may reside in the memory 114 and instructions of the switching application 116 may execute in the CPU 112. The switching application 116 may be capable of data replication between the primary storage subsystem 102 and secondary storage subsystem 104, and a switching from the primary storage subsystem 102 to the secondary storage subsystem 104 in the event of a failure of the primary storage subsystem 102. In certain alternative implementations, the switching application 116 may be implemented as a hardware circuitry within the switch 106. The buffer 118 may correspond to an area in the memory 114 where the switching application 116 stores certain data.

The plurality of clients 108a. . . 108n may be any computational devices known in the art and may send commands to the host 100 over the network 110. The network 110 may be any network known in the art, such as, the Internet, an intranet, a Local area network (LAN), a Storage area network (SAN), a Wide area network (WAN), a wireless network etc. The clients 108a. . . 108n may alternatively be connected to the host 100 without a network, such as through direct lines, common bus systems, etc., in a manner known in the art. Also the network 110 may be part of one or more larger networks or may be an independent network or may be comprised of multiple interconnected networks.

Although only a single host 100 and two storage subsystems 102, 104 have been shown, in alternative implementations of the invention a plurality of hosts may be connected to a plurality of storage subsystems via the switch 106.

Therefore, FIG. 1 illustrates how the switching application performs data replication between the primary storage subsystem 102 and secondary storage subsystem 104 and switches from the primary storage subsystem 102 to the secondary storage subsystem 104 in the event of a failure of the primary storage subsystem 102.

Figure 2:
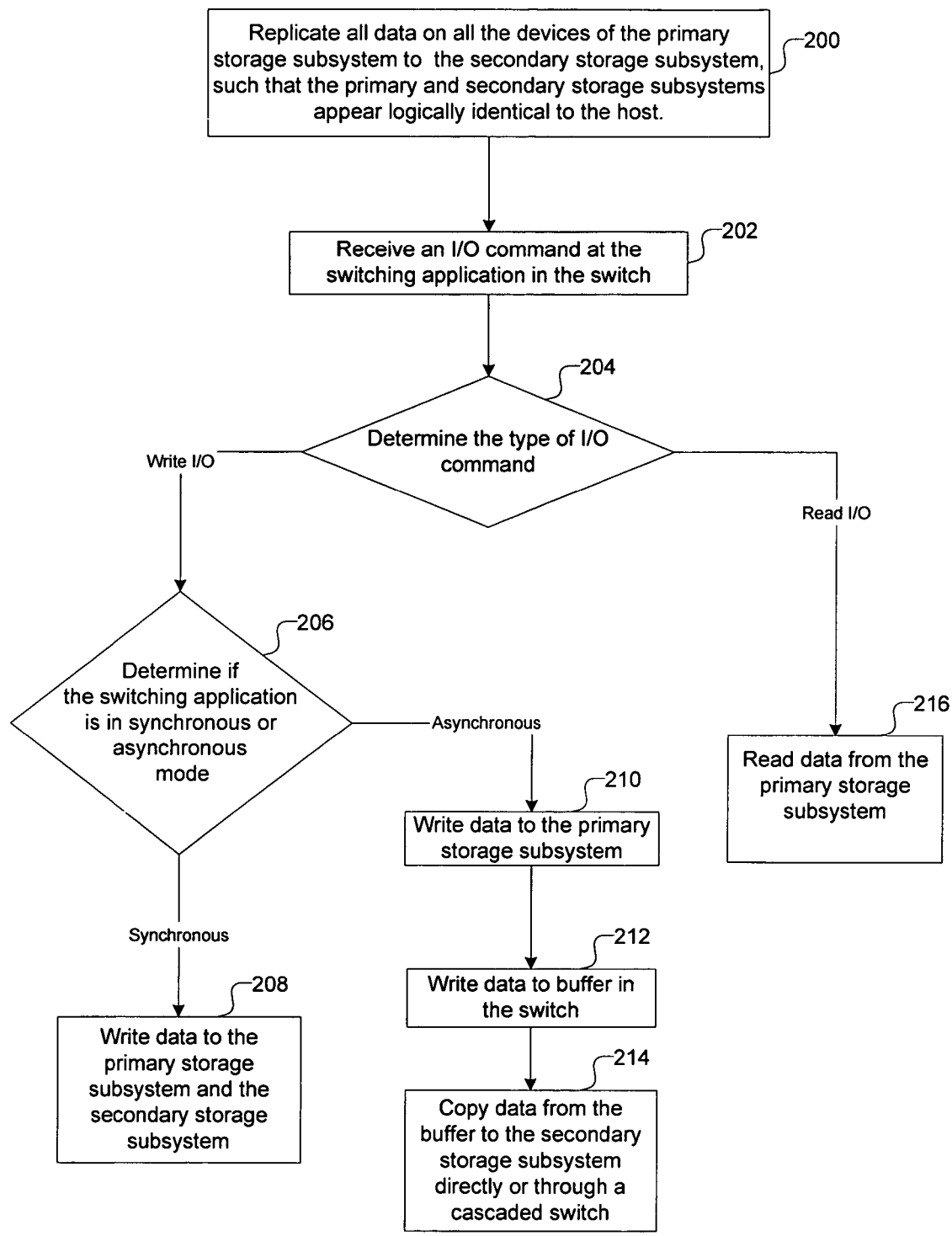
FIG. 2 illustrates logic for replicating data, in accordance with certain described implementations of the invention.

FIG. 2 illustrates logic for replicating data implemented in the switch 106, in accordance with certain implementations of the invention.

Control starts at block 200, where block 200 reflects a state where the switching application 116 included in the switch 106 has already replicated all data on all the devices of the primary storage subsystem 102 to the secondary storage subsystem 104, such that the primary storage subsystem 102 and secondary storage subsystem 104 appear logically identical to the host 100. The switching application 116 receives (at block 202) an I/O command from the host 100. The switching application determines (at block 204) the type of the received I/O command. If the I/O command is a write I/O command then the switching application 116 determines (at block 206) whether the switching application 116 has to replicate data in a synchronous or in an asynchronous mode. If the switching application 116 determines (at block 206) that data is to replicated in a synchronous mode then the switching application 116 writes data to the primary storage subsystem 102 and the secondary storage subsystem 104 in response to the I/O write request. Therefore, in the synchronous mode the switching application 116 writes data synchronously, i.e., substantially simultaneously, to both the primary storage subsystem 102 and the secondary storage subsystem 104.

If the switching application 116 determines (at block 206) that data is to be replicated in an asynchronous mode then the switching application 116 writes (at block 210) data to the primary storage subsystem 102. The switching application 116 also writes (at block 212) the data to the buffer 118. At a subsequent time, the switching application 116 copies (at block 214) the data from the buffer 118 to the secondary storage subsystem 104 either directly or through a cascaded switch. Therefore, the data is replicated between the primary storage subsystem 102 and the secondary storage subsystem 104 asynchronously by the switching application 116. The buffer 118 stores the data temporarily during the asynchronous replication.

If the switching application 116 determines (at block 204) that the type of the I/O command is a read I/O command then the switching application 116 reads data from the primary storage subsystem 102.

Therefore, FIG. 2 illustrates how the switching application 116 writes data to both the primary storage subsystem 102 and the secondary storage subsystem 104 in response to a write I/O request, and reads data from the primary storage subsystem 102 in response to a read I/O request. Therefore, the switching application 116 replicates data between the primary storage subsystem 102 and the secondary storage subsystem 104. The switching application 116 uses the primary storage subsystem 102 to read data.

Figure 3:
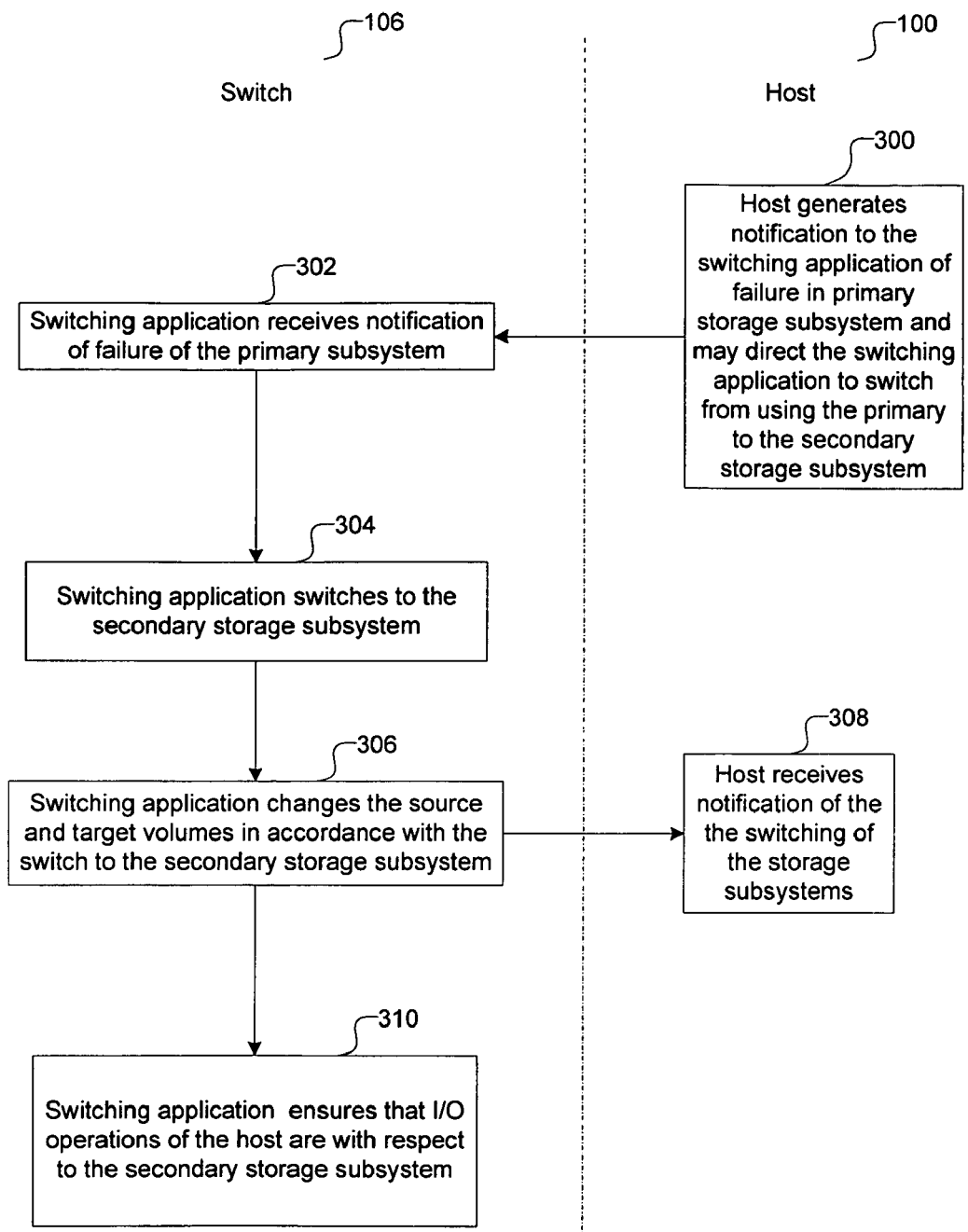
FIG. 3 illustrates logic for failure recovery, in accordance with certain described implementations of the invention.

FIG. 3 illustrates logic for failure recovery as implemented in the switch 106, in accordance with certain described implementations of the invention.

Control starts at block 300 where the host 100 generates a notification to the switching application 116 of a failure in the primary storage subsystem 102 and may direct the switching application 116, to switch from using the primary storage subsystem 102 to the secondary storage subsystem 104 for both planned and unplanned outages. For example, the host 100 may generate such a notification when the host 100 receives error messages in response to commands from the host 100 that have been directed to the primary storage subsystem 102 by the switching application 116. Furthermore, in the case of unplanned outages, the host 100 may detect the failure of the primary storage subsystem 102 directly and notifications may be issued for the host 100, switches and storage subsystems for appropriate actions.

The switching application 116 receives (at block 302) the generated notification from the host 100, where the generated notification indicates a failure in the primary storage subsystem 102. The switching application 116 switches (at block 304) to the secondary storage subsystem 104. Switching from the primary storage subsystem 102 to the secondary storage subsystem 104 implies that commands received from the host 100 at the switch 106 would be directed by the switching application 116 to the secondary storage subsystem 104 rather than to the primary storage subsystem 102.

The switching application 116 changes (at block 306) the source and target volumes of commands received from the host 100 in accordance with the switch to the secondary storage subsystem 104. For example, if the source volume was volume S1 in the primary storage subsystem 102, and the target volume was volume T1 in the primary storage subsystem 102, then the switching application 116 may switch the source volume to volume S2 and the target volume to volume T2 where volumes S2 and T2 are in the secondary storage subsystem 104 and volumes S2 and T2 have the same data as volumes S1 and T1.

The host receives (at block 308) a notification of the switching from the switching application 116. Also, the switching application 116 ensures (at block 310) that subsequent I/O operations of the host 100 are with respect to the secondary storage subsystem 104, i.e., requests from the host 100 are directed to the secondary storage subsystem 104 by the switching application. 116.

Therefore, FIG. 3 illustrates how the switching application 116 switches requests from the host 100 to be directed to the secondary storage subsystem 104 in the event of a failure of the primary storage subsystem 102. The switch 106 resides in a datapath between the host 100 and the storage subsystem 102, 104. Since the switching is performed in the switch 106, the switching takes less time when compared to implementations where the switching is performed by an application resident on one or more the storage subsystems 102, 104.

Figure 4:
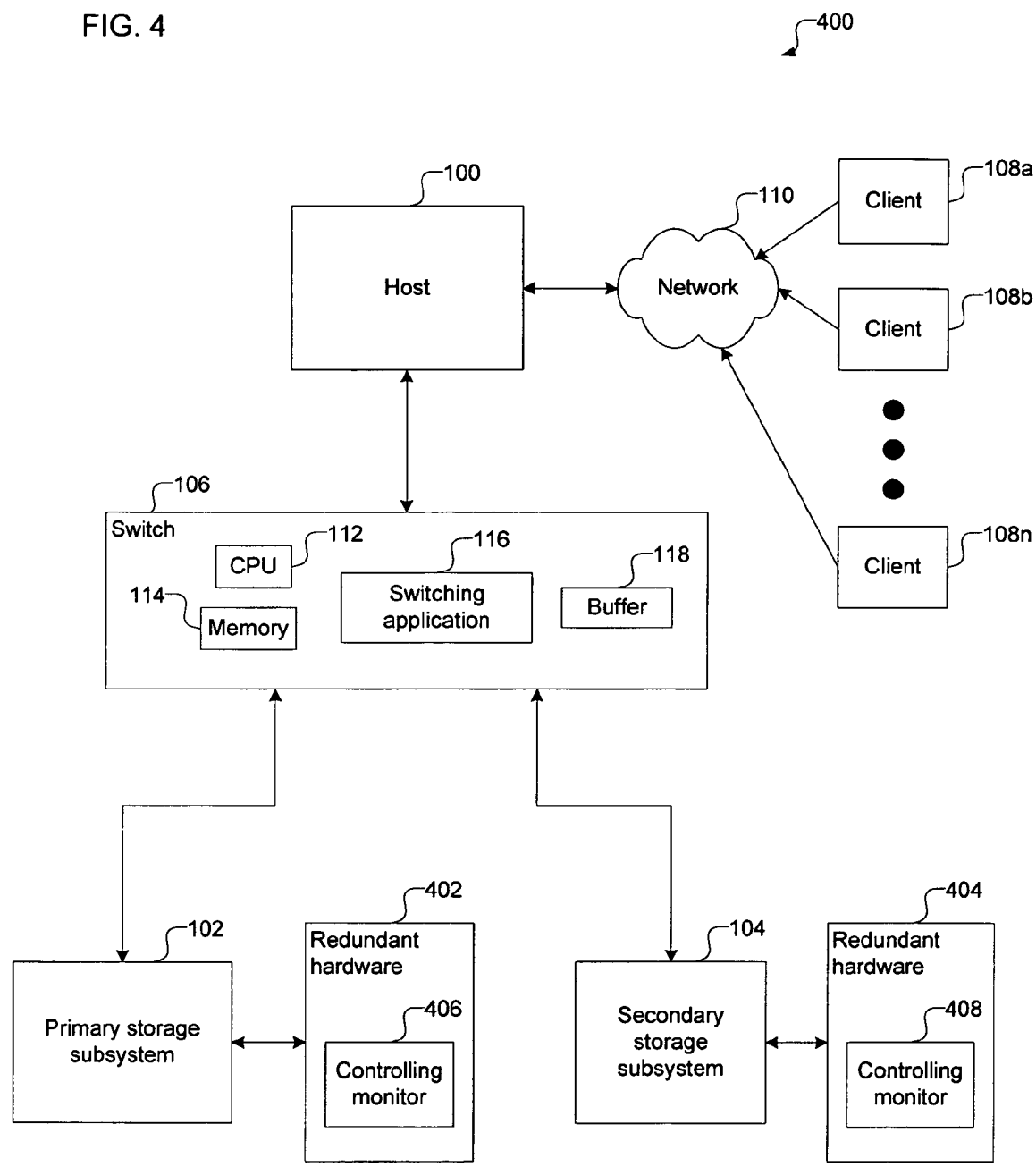
FIG. 4 illustrates a block diagram of a second computing environment, in accordance with certain described aspects of the invention.

FIG. 4 illustrates a block diagram of a second computing environment 400, in accordance with certain aspects of the invention. In the computing environment 400 redundant hardware 402 is coupled to the primary storage subsystem 102 and redundant hardware 404 is coupled to the secondary storage subsystem 104. The redundant hardware 402 and 404 are any storage subsystems known in the art. Although two units of redundant hardware 402 and 404 are shown there may be a fewer number of units of redundant hardware potentially shared between the primary storage subsystem 102 and the secondary storage subsystem 104 or a greater number of units of redundant hardware not shared between the primary storage subsystem 102 and the secondary storage subsystem 104.

A redundant hardware may include an application, such as a controlling monitor, that may trap alerts related to I/O failure and notify the switch 106 to perform a switch from one storage subsystem to another storage subsystem. For example, controlling monitor 406 may reside in the redundant hardware 402 and controlling monitor 408 may reside in the redundant hardware 404.

Therefore, FIG. 4 illustrates how a controlling monitor, such as, controlling monitor 406, 408 traps alerts related to I/O failures and notifies the switch 106 to perform a switch from one storage subsystem to another. In alternative implementations, a controlling monitor 406, 408 may notify a plurality of switches involved in maintaining consistent data across storage subsystems to perform switches among storage subsystems.

Figure 5:
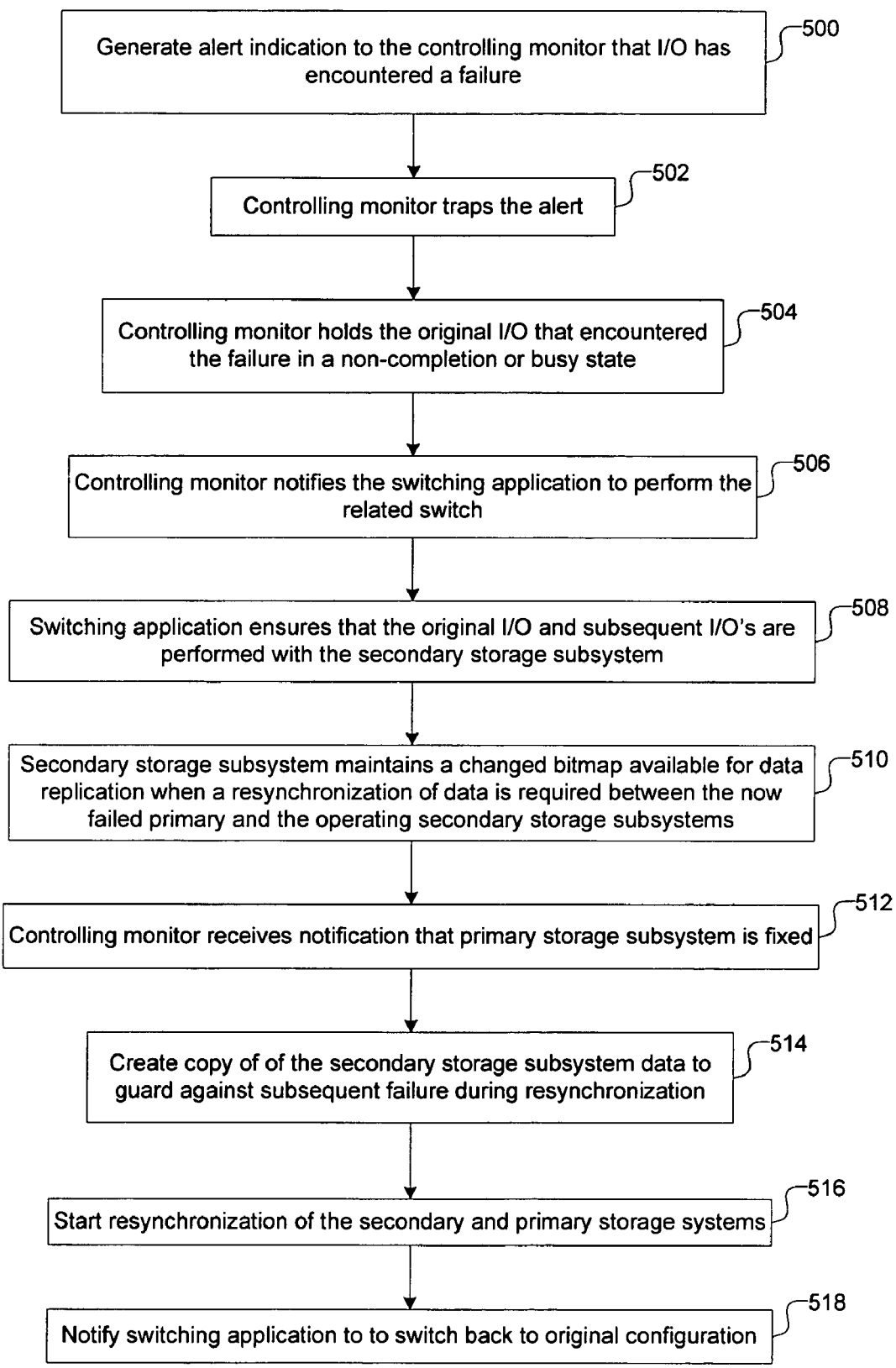
FIG. 5 illustrates logic for replicating data and failure recovery, in accordance with certain described implementations of the invention.

FIG. 5 illustrates logic for replicating data and failure recovery as implemented in the second computing environment 400, in accordance with certain implementations of the invention.

Control starts at block 500, where an alert indication may be generated to the controlling monitor 406 indicating that I/O with respect to the primary storage subsystem 102 has encountered a failure. In certain implementations, the alert indication may be raised by the host 100. In other implementations, the alert indication may be raised by the switch 106 or by the primary storage subsystem 102. The controlling monitor 406 traps (at block 502) the alert. By trapping the alert in a manner known in the art, the controlling monitor 406 holds (at block 504) the original I/O that encountered the failure in a non-completion or busy state.

The controlling monitor 406 notifies (at block 506) the switching application 116 to perform the related switch from the primary storage subsystem 102 to the secondary storage subsystem 104. The switching application 116 ensures (at block 508) that the original I/O and subsequent I/Os are performed with respect to the secondary storage subsystem 104.

In certain implementations, the secondary storage subsystem 104 maintains (at block 510) a bitmap that is available for data replication when a resynchronization of data is required between the now failed primary storage subsystem 102 and currently operating secondary storage subsystem 104. The bitmap is a representative data structure for storing pointers or other data structures related to fast copying of data, such as, via FlashCopy, between two storage subsystems in a manner known in the art.

The controlling monitor receives (at block 512) a notification that the primary storage subsystem 102 is fixed, where in certain implementations the primary storage subsystem 102 may be fixed via user intervention or via an automated error recovery technique.

A fast replication method, such as, FlashCopy, may be used by the secondary storage subsystem 104 to create (at block 514) a copy of the secondary storage subsystem data to the redundant hardware 404 to guard against subsequent failure of a storage subsystem during resynchronization of the primary storage subsystem 102 to the secondary storage subsystem 104.

In certain implementations, the controlling monitor 406 may start (at block 516) a resynchronization of the primary storage subsystem 102 to the secondary storage subsystem 104. The controlling monitor 406 notifies (at block 518) the switching application 116 to switch back to the original configuration after the resynchronization, i.e., I/O is to be performed with respect to the primary storage subsystem 102 after the resynchronization.

Therefore, FIG. 5 illustrates how a controlling monitor residing in redundant hardware 402 traps I/O related alerts, indicates to the switching application 116 to switch storage subsystems, causes a resynchronization of data, and subsequently notifies the switching application 116 to switch back to the original configuration.

The implementations ensure that data replication is performed via a switch located in the datapath between the host and storage subsystems. The switch may substitute a primary storage subsystem with a secondary storage subsystem in case of failure of the primary storage subsystem. Since the data replication and failure recovery is performed via a switch, recovery from failure can occur substantially instantaneously when compared to systems where data replication and recovery are performed via implementations in the host or the storage subsystem. The storage subsystem switching can occur in the switch at electronic speeds. A monitoring application residing in redundant hardware coupled to a storage subsystem may trap I/O related alerts, indicate to the switch to switch storage subsystems, cause a resynchronization of data between storage subsystems, and subsequently notify the switch to switch back to the original configuration.

The implementations eliminate the need for operating system involvement in the switching of the primary storage subsystem to the secondary storage subsystem in the event of a failure of the primary storage subsystem. By implementing the switching application in the switch, the switching of the primary and the secondary storage subsystems are performed at electronic speeds, and in many cases in less than a second. The fast availability of data enables application that cannot tolerate significant delays to run seamlessly in the event of a failure of the primary storage subsystem. The switch also maintains cross volume data integrity and data consistency between the primary and the secondary storage subsystems. Furthermore, the primary and secondary storage subsystems may be located either in the same data center or in different data centers that are geographically dispersed and at the same time provide for disaster recovery and a high availability solution.

In the implementations, both storage subsystems 102, 104 appear identical from the perspective of the host 100. Furthermore, in the implementations the re-directing of the I/O by the switch 106 does not require any involvement by the operating systems software or applications residing on the host 100, i.e., the switching function is not directed by the host 100. The switch based method provided by the implementations of the invention is near instantaneous in switching the subsystems. In may cases, the time to switch subsystems via the switch is a few microseconds.

Additional Implementation Details

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

Figure 6:
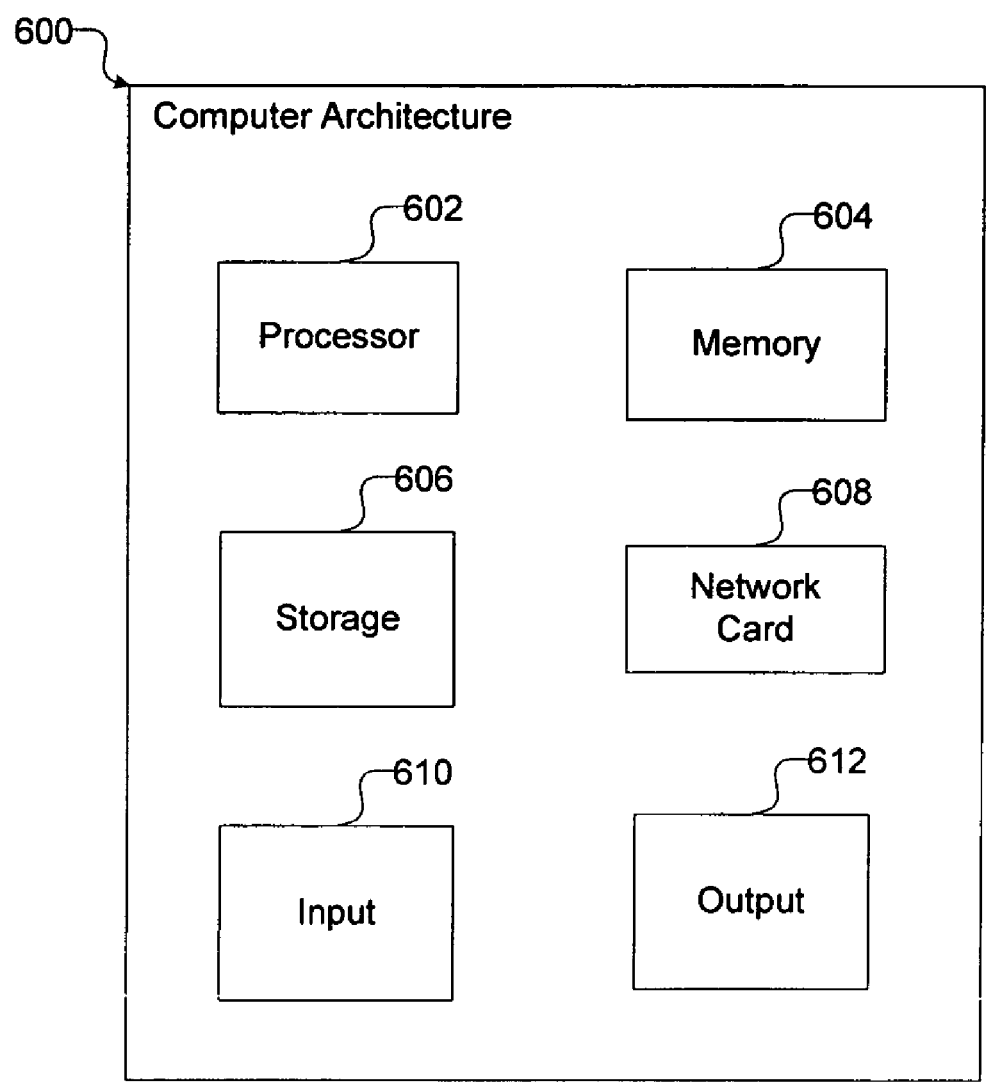
FIG. 6 illustrates a block diagram of a computer architecture in which certain described aspects of the invention are implemented.

FIG. 6 illustrates a block diagram of a computer architecture in which certain aspects of the invention are implemented. FIG. 6 illustrates one implementation of the host 100 or a computational unit similar to the switch 106. The host 100 or computational unit similar to the switch 106 may implement a computer architecture 600 having a processor 602 (e.g., a microprocessor, such as the CPU 112), a memory 604 (e.g., a volatile memory device, such as memory 114), and optionally storage 606 (e.g., a non-volatile storage, magnetic disk drives, optical disk drives, tape drives, etc.). The storage 606 may comprise an internal storage device, an attached storage device or a network accessible storage device. Programs in the storage 606 may be loaded into the memory 604 and executed by the processor 602 in a manner known in the art. The architecture may further include a network card 608 to enable communication with a network. The architecture may also include at least one input 610, such as a keyboard, a touchscreen, a pen, voice-activated input, etc., and at least one output 612, such as a display device, a speaker, a printer, etc. In certain implementations, the switch 106 may be a switch known in the art without the storage 606, the network card 608, and the output 612. Furthermore, the switch 106 may receive inputs in ways different from input 610.

The logic of FIGS. 2, 3 and 5 describe specific operations occurring in a particular order. Further, the operations may be performed in parallel as well as sequentially. In alternative implementations, certain of the logic operations may be performed in a different order, modified or removed and still implement implementations of the present invention. Morever, steps may be added to the above described logic and still conform to the implementations. Yet further steps may be performed by a single process or distributed processes.

Many of the software and hardware components have been described in separate modules for purposes of illustration. Such components may be integrated into a fewer number of components or divided into a larger number of components. Additionally, certain operations described as performed by a specific component may be performed by other components.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method comprising:

receiving an I/O command at a switch from a host;

if the I/O command is a write I/O, then writing data via the switch to a primary storage subsystem and a secondary storage subsystem, wherein the switch couples the host to the primary storage subsystem and the secondary storage subsystem, and wherein the data written to the primary storage subsystem and the data written to the secondary storage subsystem are the same;

receiving an indication of a failure of the primary storage subsystem at the switch; and subsequently, directing a command from the host received at the switch to the secondary storage subsystem for completion by changing a source volume and a target volume in the command to correspond to volumes in the secondary storage subsystem, wherein the source volume and the target volume are for I/O operations, and wherein the changing is performed by a switching application in the switch, wherein a hardware unit is coupled to the primary storage subsystem, wherein the hardware unit traps alerts related to I/O failures and notifies the switch to perform the changing, and wherein in response to the hardware unit receiving a notification that the primary storage subsystem is fixed creating a copy of secondary storage subsystem data to guard against any subsequent failure during resynchronization of the primary and secondary storage systems.

2. The method of claim 1, wherein the switch is an I/O switch implemented in a fibre channel mechanism.

3. The method of claim 2, wherein the notification is a first notification, the method further comprising:
receiving a second notification at the switch from a monitor application that traps an I/O alert corresponding to the failure, wherein the monitor application is coupled to the hardware unit coupled to the primary storage subsystem; and
holding an I/O request that resulted in the failure in a busy state at the monitor application.

4. The method of claim 2, wherein the notification is a first notification, the method further comprising:
receiving a second notification at a monitor application that the primary storage subsystem is functioning properly, wherein the monitor application is coupled to the hardware unit coupled to the primary storage subsystem; and
synchronizing data in the secondary storage subsystem to the primary storage subsystem; and
directing a command from the host received at the switch to the primary storage subsystem for completion.

5. The method of claim 4, wherein the primary storage subsystem and the secondary storage subsystem comprise a plurality of logical storage units, and wherein if the I/O command is a read I/O, then reading the data from the primary storage subsystem.

6. The method of claim 5, further comprising:
determining if the switching application in the switch is in an asynchronous mode;
if the switching application is in an asynchronous mode, then:
(i) writing the data to the primary storage subsystem;
(ii) writing the data to a buffer in the switch; and
(iii) copying the data from the switch to the secondary storage subsystem;
determining if the switching application in the switch is in a synchronous mode; and
if the switching application is in a synchronous mode, then writing the data to the primary storage subsystem and the secondary storage subsystem substantially simultaneously.

7. The method of claim 6, wherein the secondary storage subsystem maintains a bitmap that is available for data replication when resynchronization of the data is required between secondary storage subsystem and the primary storage subsystem whose failure was indicated earlier.

8. A system comprising:
a primary storage subsystem;
a secondary subsystem;
a switch, wherein the switch couples a host to the primary storage subsystem and the secondary storage subsystem;
means for receiving an I/O command at a switch from a host;
means for writing data via the switch to the primary storage subsystem and the secondary storage subsystem if the I/O command is a write I/O, and wherein the data written to the primary storage subsystem and the data written to the secondary storage subsystem are the same;
means for receiving an indication of a failure of the primary storage subsystem at the switch; and
means for directing a command from the host received at the switch to the secondary storage subsystem for completion, by changing a source volume and a target volume in the command to correspond to volumes in the secondary storage subsystem, wherein the source volume and the target volume are for I/O operations, and wherein the changing is performed by a switching application in the switch, wherein a hardware unit is coupled to the primary storage subsystem, wherein the hardware unit traps alerts related to I/O failures and notifies the switch to perform the changing, and wherein in response to the hardware unit receiving a notification that the primary storage subsystem is fixed creating a copy of secondary storage subsystem data to guard against any subsequent failure during resynchronization of the primary and secondary storage systems.

9. The system of claim 8, wherein the switch is an I/O switch implemented in a fibre channel mechanism.

10. The system of claim 9, wherein the notification is a first notification, the system further comprising:
means for receiving a second notification at the switch from a monitor application that traps an I/O alert corresponding to the failure, wherein the monitor application is coupled to the hardware unit coupled to the primary storage subsystem; and
means for holding an I/O request that resulted in the failure in a busy state at the monitor application.

11. The system of claim 9, wherein the notification is a first notification, the system further comprising:
a monitor application coupled to the hardware unit;
means for receiving a second notification at the monitor application that the primary storage subsystem is functioning property; and
means for synchronizing data in the secondary storage subsystem to the primary storage subsystem; and
means for directing a command from the host received at the switch to the primary storage subsystem for completion.

12. The system of claim 11, wherein the primary storage subsystem and the secondary storage subsystem comprise a plurality of logical storage units, and wherein if the I/O command is a read I/O, then reading the data from the primary storage subsystem.

13. The system of claim 12, further comprising:
means for determining if the switching application in the switch is in an asynchronous mode, wherein if the switching application is in an asynchronous mode, then:
(i) writing the data to the primary storage subsystem;
(ii) writing the data to a buffer in the switch; and
(iii) copying the data from the switch to the secondary storage subsystem; and
means for determining if the switching application in the switch is in a synchronous mode, wherein if the switching application is in a synchronous mode, then writing the data to the primary storage subsystem and the secondary storage subsystem substantially simultaneously.

14. The system of claim 13, wherein the secondary storage subsystem maintains a bitmap that is available for data replication when resynchronization of the data is required between secondary storage subsystem and the primary storage subsystem whose failure was indicated earlier.

15. A computer readable storage medium including code, wherein the code in response to being executed by a processor is capable of causing operations, the operations comprising:

receiving an I/O command at a switch from a host;

if the I/O command is a write I/O, then writing data via the switch to a primary storage subsystem and a secondary storage subsystem, wherein the switch couples the host to the primary storage subsystem and the secondary storage subsystem, and wherein the data written to the primary storage subsystem and the data written to the secondary storage subsystem are the same;

receiving an indication of a failure of the primary storage subsystem at the switch; and subsequently, directing a command from the host received at the switch to the secondary storage subsystem for completion by changing a source volume and a target volume in the command to correspond to volumes in the secondary storage subsystem, wherein the source volume and the target volume are for I/O operations, and wherein the changing is performed by a switching application in the switch, wherein a hardware unit is coupled to the primary storage subsystem, wherein the hardware unit traps alerts related to I/O failures and notifies the switch to perform the changing, and wherein in response to the hardware unit receiving a notification that the primary storage subsystem is fixed creating a copy of secondary storage subsystem data to guard against any subsequent failure during resynchronization of the primary and secondary storage systems.

16. The computer readable storage medium of claim 15, wherein the switch is an I/O switch implemented in a fibre channel mechanism.

17. The computer readable storage medium of claim 16, wherein the notification is a first notification, the operations further comprising:

receiving a second notification at the switch from a monitor application that traps an I/O alert corresponding to the failure, wherein the monitor application is coupled to the hardware unit coupled to the primary storage subsystem; and holding an I/O request that resulted in the failure in a busy state at the monitor application.

18. The computer readable storage medium of claim 16, wherein the notification is a first notification, the operations further comprising:

receiving a second notification at a monitor application that the primary storage subsystem is functioning properly, wherein the monitor application is coupled to the hardware unit coupled to the primary storage subsystem; and synchronizing data in the secondary storage subsystem to the primary storage subsystem; and directing a command from the host received at the switch to the primary storage subsystem for completion.

19. The computer readable storage medium of claim 18, wherein the primary storage subsystem and the secondary storage subsystem comprise a plurality of logical storage units, and wherein if the I/O command is a read I/O, then reading the data from the primary storage subsystem.

20. The computer readable storage medium of claim 19, further comprising:

determining if the switching application in the switch is in an asynchronous mode;

if the switching application is in an asynchronous mode, then:

(i) writing the data to the primary storage subsystem;

(ii) writing the data to a buffer in the switch; and (iii) copying the data from the switch to the secondary storage subsystem;

determining if the switching application in the switch is in a synchronous mode; and if the switching application is in a synchronous mode, then writing the data to the primary storage subsystem and the secondary storage subsystem substantially simultaneously.

21. The computer readable storage medium of claim 20, wherein the secondary storage subsystem maintains a bitmap that is available for data replication when resynchronization of the data is required between secondary storage subsystem and the primary storage subsystem whose failure was indicated earlier.

* * * * *